US008692649B2

(12) United States Patent
Clevenger et al.

(10) Patent No.: US 8,692,649 B2
(45) Date of Patent: Apr. 8, 2014

(54) ASSET MANAGEMENT INFRASTRUCTURE

(75) Inventors: Lawrence A. Clevenger, LaGrangeville, NY (US); Rainer K. Krause, Kostheim (DE); Kevin S. Petrarca, Newburgh, NY (US); Carl J. Radens, LaGrangeville, NY (US); Brian C. Sapp, Guilderland, NY (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 13/296,242

(22) Filed: Nov. 15, 2011

(65) Prior Publication Data

US 2012/0126937 A1    May 24, 2012

(30) Foreign Application Priority Data

Nov. 22, 2010  (EP) ..................................... 10192113

(51) Int. Cl.
*H04Q 9/00*    (2006.01)
(52) U.S. Cl.
USPC ....... 340/5.6; 340/5.61; 340/10.1; 340/568.1; 340/572.1; 340/572.8
(58) Field of Classification Search
USPC ........ 340/5.6, 5.61, 10.1, 568.1, 572.1–572.8
See application file for complete search history.

(56) References Cited

U.S. PATENT DOCUMENTS

| 6,975,222 | B2 * | 12/2005 | Krishan et al. ........... 340/539.13 |
| 7,310,344 | B1 | 12/2007 | Sue |
| 7,339,477 | B2 | 3/2008 | Puzio et al. |
| 7,420,467 | B2 * | 9/2008 | Patenaude et al. ......... 340/572.1 |
| 7,671,735 | B2 | 3/2010 | Karaoguz et al. |
| 2008/0030322 | A1 | 2/2008 | Stauffer et al. |
| 2008/0137572 | A1 | 6/2008 | Park et al. |
| 2008/0221715 | A1 | 9/2008 | Krzyzanowski et al. |

FOREIGN PATENT DOCUMENTS

| CN | 1289964 | 4/2001 |
| CN | 1523822 | 8/2004 |
| WO | WO 96/03728 A1 | 2/1996 |
| WO | WO 01/75830 A1 | 10/2001 |

OTHER PUBLICATIONS

IPCOM000190174D, "Method and System for Providing Seamless Asset Access and Active Verification of Authorization and Utilization of Assets", published by IP.com, Nov. 19, 1009. 4 pages.
IPCOM000015005D, "Laptop Security System", published by IP.com, Nov. 5, 2001. 3 pages.
McKay, Micheale, et al., IPCOM000127447D, "Cellular General Purpose User Module", published by IP.com, Copyright Sony Electronics Inc., Aug. 30, 2005. 3 pages.

* cited by examiner

*Primary Examiner* — Tai T Nguyen
(74) *Attorney, Agent, or Firm* — Marcia L. Doubet (57) ABSTRACT

Asset management for control of electric appliances comprises a keycode unit and an equipment unit embedded in an appliance. The keycode unit is located in a protected environment and relates to an asset management area. The equipment unit may store an appliance identification code. The keycode unit and the equipment unit may be in communication contact, whereby the equipment unit sends positioning coordinates to the keycode unit, and wherein the equipment unit is adapted to lock the appliance via the lock unit, in response to a lock signal that the equipment unit receives from the keycode unit, if the appliance moves outside the asset management area.

16 Claims, 8 Drawing Sheets

ASSET MANAGEMENT INFRASTRUCTURE

BACKGROUND

The invention relates generally to asset management for control of electric appliances.

Electronic and electric equipment management in private homes, as well as in commercial and industrial environments, may be realized by using advanced technologies and smart solution features for locating the equipment based on RFID technology. This may be supporting the equipment using electronic features implemented in hardware to register and initialize devices. After such a registration, the equipment may be linked via a registration key to the entire household or industrial environment. If the equipment is removed without a defined procedure, it may be disabled and cannot be used in a different environment.

Several approaches have been followed in order to improve control of electric appliances. U.S. Pat. No. 7,339,477 B2 discloses features of monitoring and controlling electric and electronic appliances by embedding an RFID tag in each electrical and electronic appliance located in a closed loop environment. The document discloses a locking in the event of an unauthorized removal/transport of the appliance outside a closed loop environment. For this purpose, there is provided a master control device that wirelessly communicates with an asset based on a unique identifier. The master control device is capable of detecting once it may be removed outside a defined area. In case the assets are power tools, an alarm event may include locking the functional circuitry of one or more of the assets. A location detection may be based on GPS (global positioning system) or a triangulation utilizing multiple antennas.

U.S. Patent Publication 2008/0030322 A1 discloses monitoring and controlling electrical and electronic appliances by embedding a chip in each electrical or electronic appliance. A tracking of a location of the appliance may be realized by tracking the chip inside the appliance based on GPS coordinates. Also a disabling function of the appliance may be provided. For that, a GPS transmitter may be embedded in the housing of tracked equipment.

Document WO01/75830A1 discloses embedding a chip in each electrical or electronic appliance for a control and monitoring function. A secured appliance may include a location sensor, e.g., based on GPS. Each removable appliance may be equipped with a location sensor, and a security controller integrated within the appliance. The security controller may be arranged to inhibit at least some of the functions of the appliance when the location of the appliance indicated by data from the location sensor is not in an authorized location. A powering-up may be prevented.

Document WO096/03728 discloses enhancing security of electrical appliances by embedding a chip in the appliance. The chip may generate and transmit an identification signal carrying an identification and location of the appliance to a centralized monitoring unit for receiving an authorization signal for normal operation. A telecommunication system may be used. Tracked location information of the appliance may be compared to a normal location of the appliance.

BRIEF SUMMARY

The present invention is directed to asset management for control of electric appliances. According to one embodiment, this comprises a keycode unit and an equipment unit. The keycode unit may comprise a keycode device chip. The keycode device chip may have a first communication unit. The keycode unit may be located in a protected environment and may relate to an asset management area. A power supply for the keycode unit may be provided by induction from a power line. The equipment unit may be embedded in an appliance, and may comprise an equipment device chip comprising a positioning system unit, a lock unit, a second communication unit, and a memory. The memory may be adapted for storing an appliance identification code. The keycode unit and the equipment unit may be in communication contact to each other via the first communication unit and the second communication unit. The second communication unit may be adapted for sending positioning coordinates, which the positioning unit receives, from the equipment unit to the keycode unit. The equipment unit may be adapted to lock the appliance via the lock unit, in response to a lock signal that the equipment unit may receive from the keycode unit, if the appliance moves outside the asset management area.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

Preferred embodiments of the invention will be described, by way of example only, with reference to the drawings, in which.

DETAILED DESCRIPTION

An embodiment of the present invention provides asset management, and operates in a generally secure and reliable way that may be utilized in home environments as well as in commercial and industrial environments.

An electric appliance as discussed herein may, in particular, also be an electronic appliance. The appliance may be supplied with power by a main line or any other power supply, e.g., batteries, accumulators, solar power, etc. The keycode device chip and/or the equipment device chip discussed herein may, in particular, be an application-specific integrated circuit (ASIC). The notion of "the appliances move" as discussed herein may, in particular, also represent a passive movement of the appliance by, e.g., a person. If a person may move an appliance, this should also fall under the expression "the appliance moves".

In addition to the inductive power supply of the keycode unit, a long term battery may be used as a back-up. Moreover, the positioning system may be the satellite-based Global Positioning System (GPS) with the official name NAVSTAR GPS or an alternative positioning system, e.g., the Galileo Positioning System.

In the context of this application, the following principal terms are used:

Asset management system—The term asset management system may denote an infrastructure or parts thereof for managing and controlling electrically operated devices. These may be, e.g., household equipment, office equipment, or tools in an industrial environment like power tools. Several components may be required for the asset management system or infrastructure, like a central unit, one or more decentralized units, one or more communication networks, and a computer system required for human interface and other management and storage tasks.

Asset management area—The term asset management area may denote an area in which appliances may be detectable or controllable, i.e., under the supervision of a central management instance, e.g., a keycode unit. If an appliance may be outside the asset management area, the appliance may not be detectable inside the asset management area.

Appliance—The term appliance may denote, e.g., electrical or electronic household goods/equipment, office equipment, or tools in an industrial environment like power tools. Examples of household equipment may be dishwashers, washing machines, kitchen appliances, entertainment equipment like DVD players, music systems, radio clocks, computers, telephones, etc. Examples of industrial tools may be power tools like electrical drilling machines, compressors, electrical plows, etc. Appliances, mentioned in this document, may denote devices to be controlled by the asset management system.

Protected environment—The term protected environment may denote a location, e.g., for a keycode unit, to which normal access of unauthorized personnel is nearly impossible. E.g., the keycode unit may be sealed under concrete or built into a stone wall in such a way that it may be invisible and not accessible without damaging a protective cover. The keycode unit in the protected environment may also not be removable or otherwise susceptible for manipulation. However, the keycode unit does not need to be hidden in a building. It may also be located in a protected environment outside a building in a wall or under a protective surface.

Positioning system—The term positioning system may denote a satellite-based positioning system, like the global positioning system (GPS) or others, already mentioned above, which allow determining a unique position using global coordinates.

Locking—The term locking may denote an activity that may deactivate certain functions of an appliance. That may range from a total deactivation to just a partial deactivation of a complete appliance functionality. For example, a vacuum cleaner may only be working with a fraction of its suction power; a drill may only be operated with a limited number of rounds per minute; a mobile phone, or a phone in general, may only be used for emergency calls.

PowerLAN—The term PowerLAN may denote a local area network (LAN) that may be based on a normal power line by modulating communication information on top of existing power lines. PowerLANs may be used as an alternative for a wireless LAN.

eFuse—The term eFuse may denote a technology originally introduced by International Business Machines Corporation which allows for a dynamic real-time reprogramming of computer chips. By the use of an eFuse, or in particular a plurality of eFuses, an instruction or a series of instructions to a semiconductor chip may permanently alter the functionality of the semiconductor chip while the chip may be in operation. A permanent, irreversible disablement of a function of the chip may be achieved.

Controlling an asset management system as disclosed herein may provide a number of advantages. In particular, the system may enable an elegant way of controlling unauthorized appliance removal from a controlled area, e.g., an asset management area. However, more advantages may be derived from the inventive concept. Availability and accessibility of equipment may be determined, e.g., which equipment is available. An historic tracking may be possible. An equipment utilization may be determined, i.e., questions like "how often does a person use the equipment vs. others" including a history analysis may be answered. The energy consumption of the equipment as a single appliance, or as a complete group of appliances, may be determined and analysed in order to reduce overall power consumption. Additionally, an environmental control may be possible based on answering questions like "any failures to expect from certain equipment?". Also here, an analysis of historic data may be possible. Furthermore, a misuse and theft control may be enabled. Under-age usage of unauthorized devices and non-controlled removal may be determined. All of this may be managed in a reporting and notification environment, which may allow appliance history analysis, usage frequency reporting, and incident notification. Additionally, a wide range of other advantages may be achieved based on the inventive concept:

real-time inventory taking and asset management in warehouses, stores, companies, households, etc., high efficient parts and goods-finding in warehouses, companies, etc., tracking of medical records and lab test results and samples, hospital supplies, etc., optimized parts, goods collecting and way-routing for optimized ways of transport, optimized space allocation in warehouses, companies, etc., optimized warehouse and inventory cost management, optimized assembly, e.g., car assembly using assembly parts auto tracking and allocation, asset management at work, including utilization and power management, private household use with asset management, register goods, power consumption control, etc., and extended features, which may be switched on and off using the inventive concept, comprising eFuse technology.

Referring now to the figures, in the following, a detailed description of the drawings will be given. All illustrations in the drawings may be schematic. Firstly, a block diagram of the asset management system will be described. Afterwards, several system components and related elements will be described. Then, a block diagram of an asset management method, as well as several aspects of the method, will be described.

Figure 1:
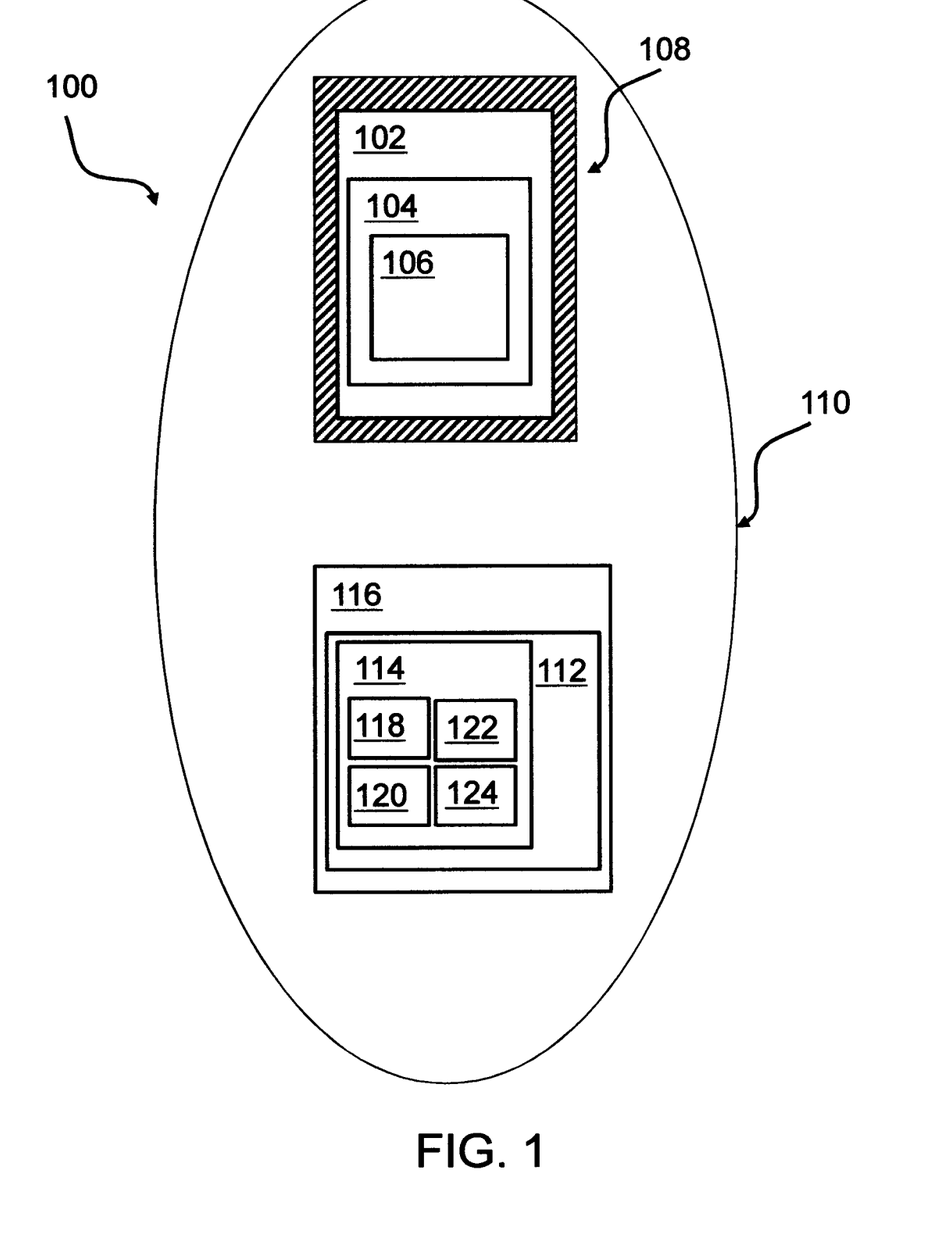
FIG. 1 shows a block diagram of an embodiment of an asset management system.

FIG. 1 shows a block diagram of an embodiment of an asset management system 100. A keycode unit 102 may comprise keycode device chip 104, which may comprise a first communication unit 106. The keycode unit may be positioned in a protected environment 108. An asset management area may symbolically be shown as ellipse 110. Any other form may also be suitable. On the other side, an appliance 116 may be shown, comprising an equipment unit 112 having an equipment device chip 114. Other elements may be recognized from FIG. 1 as part of the equipment device chip 114: a positioning system unit 118, a lock unit 120, a second communication unit 122, and a memory 124. The positioning system unit 118 may be a GPS unit.

Figure 2:
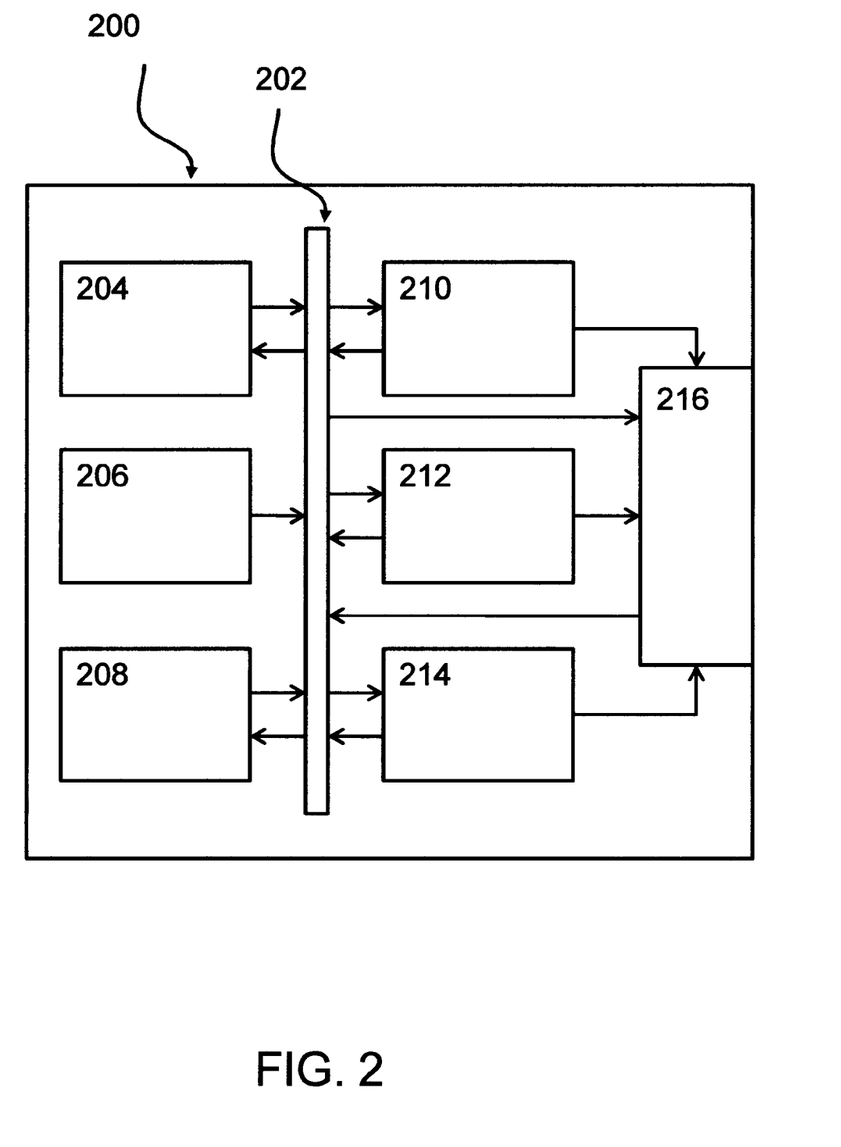
FIG. 2 shows a block diagram of an embodiment of a keycode device chip.

FIG. 2 shows a more detailed embodiment of the keycode device chip 200, comprising a memory/data storage 204, an inductive power generator 206, using one or more inductive coils, and a positioning system receiver (e.g., a GPS receiver), and lock unit 208. The lock unit as part of the positioning receiver and lock unit 208 may generate relevant signals for the lock unit of the equipment device chip. Furthermore, the keycode device chip 200 may comprise a PowerLAN driver 210, a radiofrequency (RF) unit 212, and additional logic devices, memory, and switches, represented in block 214. Block 216 may represent an interface for wireless communication of any kind. A bus 202 may connect all block elements of the keycode device chip 200.

Figure 3:
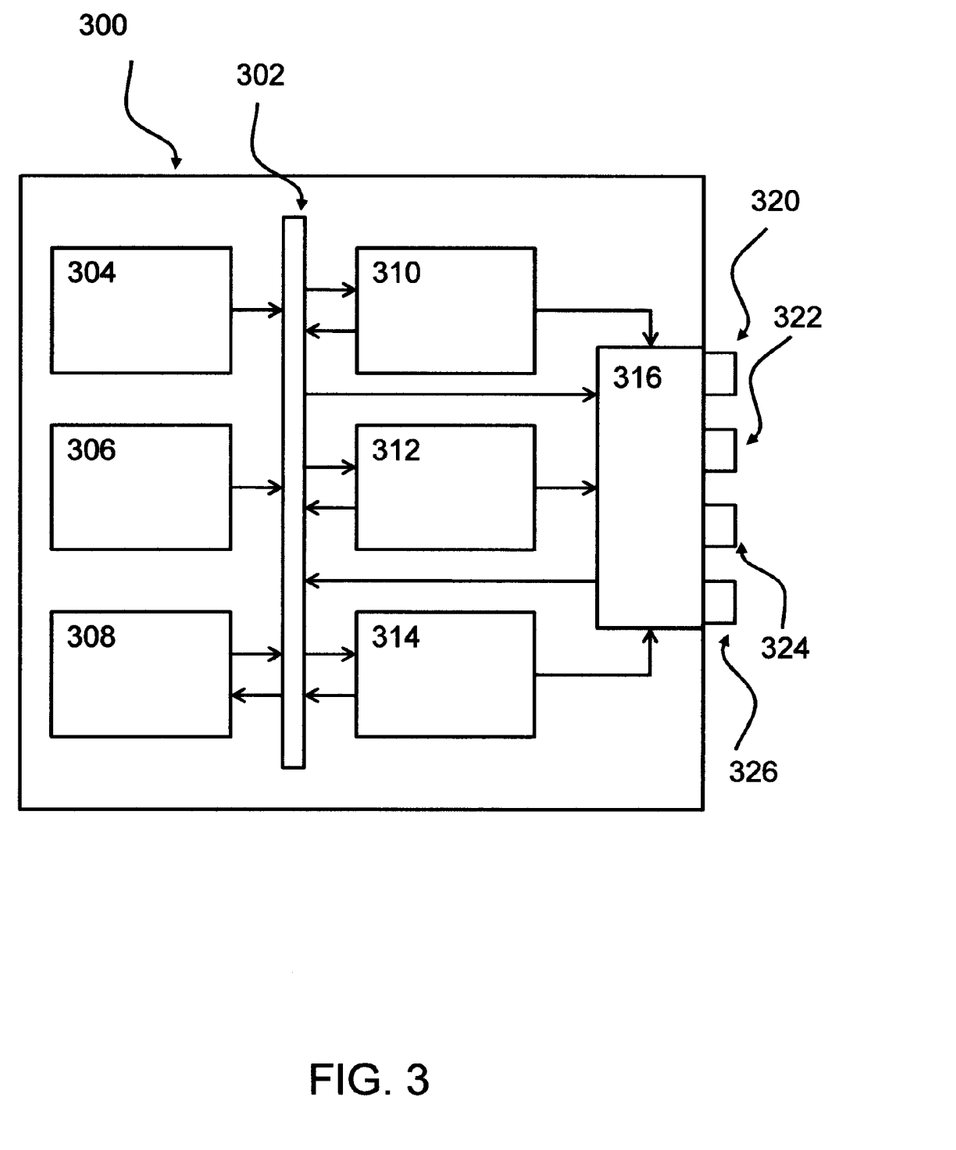
FIG. 3 shows a block diagram of an embodiment of an equipment device chip.

FIG. 3 shows a block diagram of a more detailed embodiment of an equipment device chip 300. A bus 302 may connect all following elements. The equipment device chip 300 may comprise a thermal sensor 304, which may be used to detect an overload of the appliance or the equipment device chip, a power sensor 306, which may be implemented as a magnetic or a conventional metering sensor, and a lock unit 308, which may also comprise a positioning unit (e.g., a GPS unit). Furthermore, the equipment device chip 300 may comprise a PowerLAN unit 310, a wireless communication unit 312, as well as logic devices, memory, bypass diodes, switches, and other electronic components represented by block 314. Additionally, an IO (input/output) unit 316, including a multiplexer, may be present on the equipment device chip. The equipment device chip 300 may also have external contacts 320, 322 for a power supply of the chip 300, and a common contact 326 as well as a switch contact 324 to be used to control the electrical functionality of the appliance.

Figure 4:
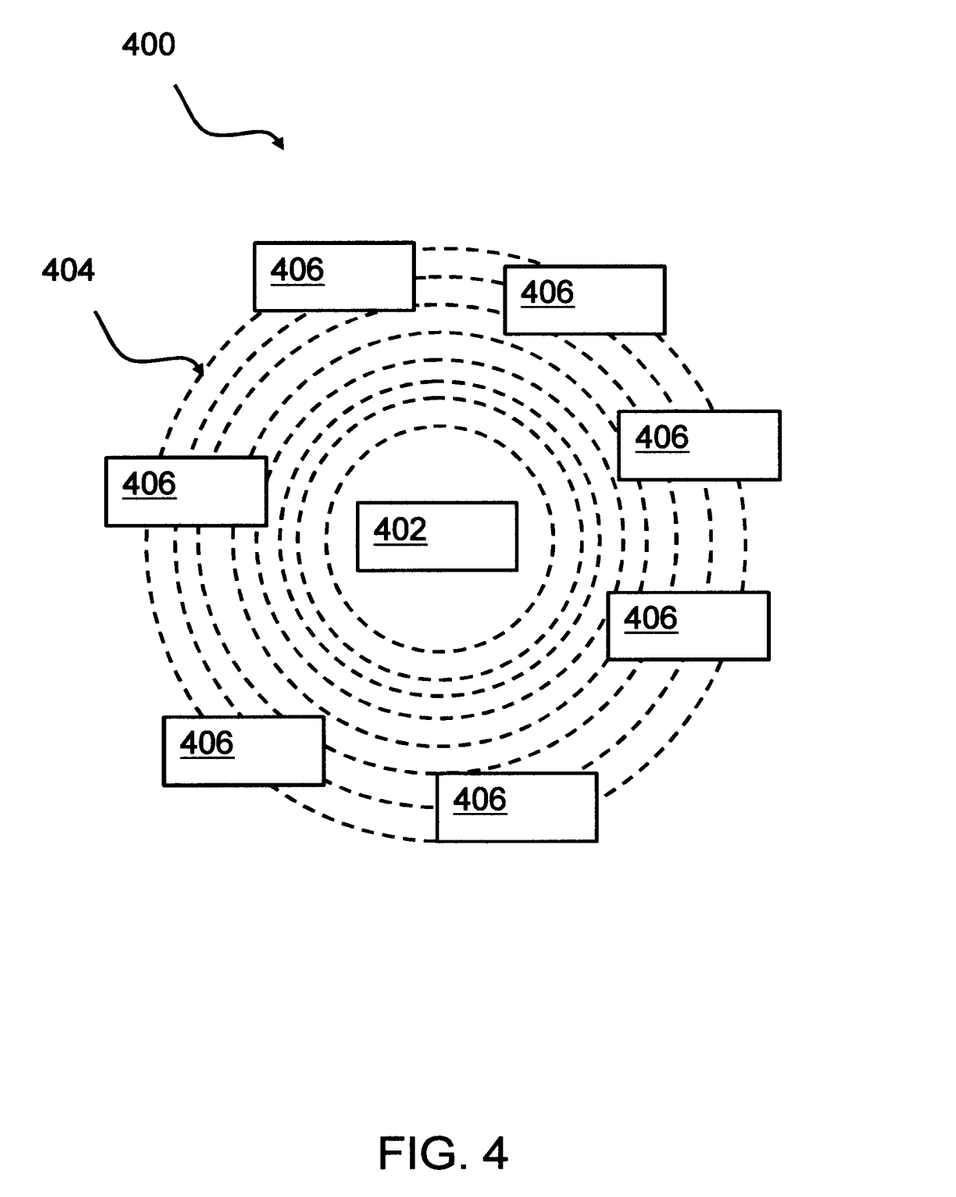
FIG. 4 illustrates schematically appliances in an asset management area.
Figure 7:
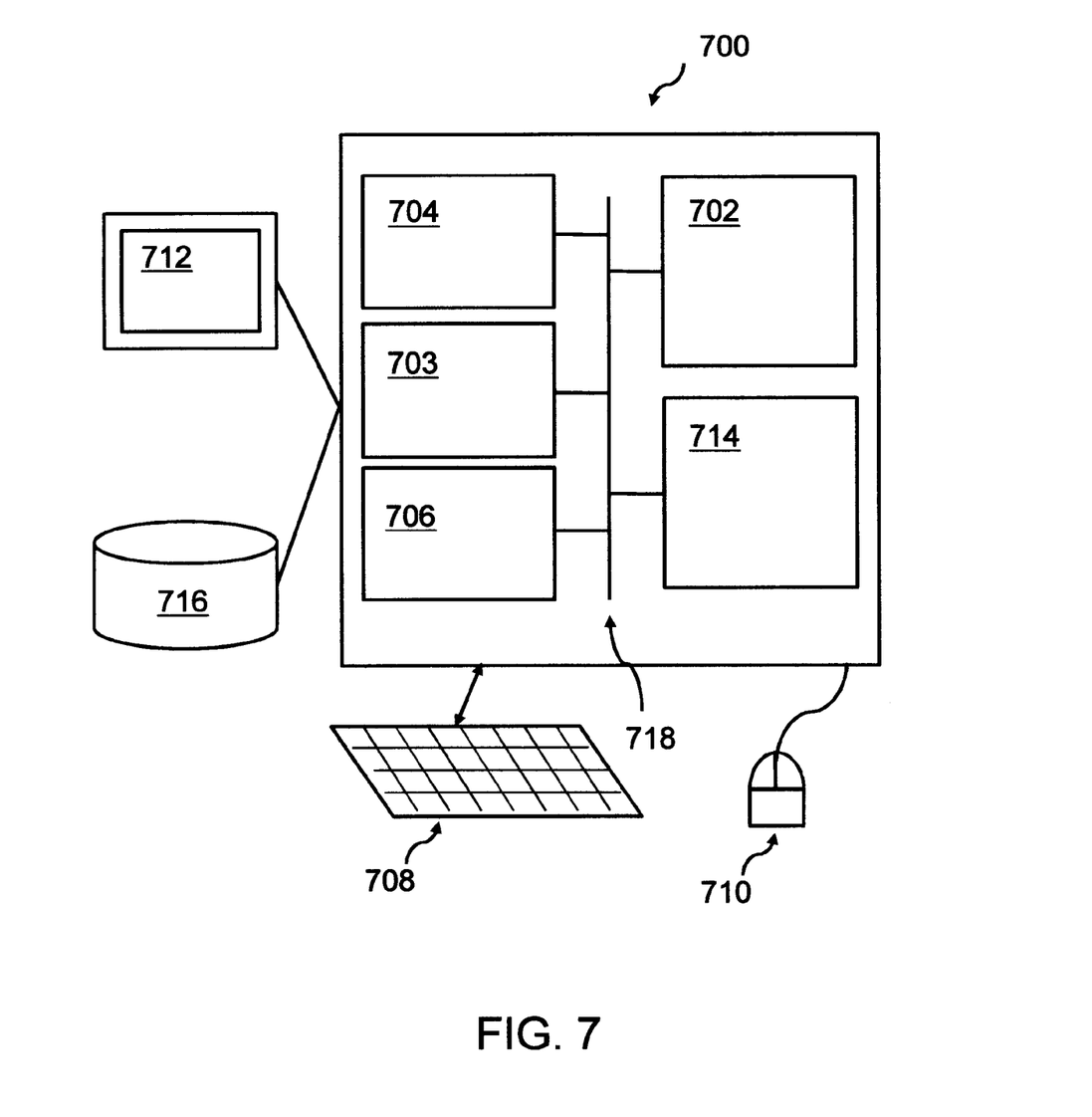
FIG. 7 shows schematically a computer system that may be connected to an asset management system.

FIG. 4 may schematically illustrate an asset management system 400 with appliances 406 and a keycode unit 402 in a center of the asset management area 404 represented by concentric circles. A plurality of equipment units in appliances 406 may be managed as part of the asset management system 400. If the keycode unit may be connected to a computer system as shown in FIG. 7, advantages and features disclosed herein may be accessible to a user via a browser, or alternatively, via an application-specific interface.

Figure 5:
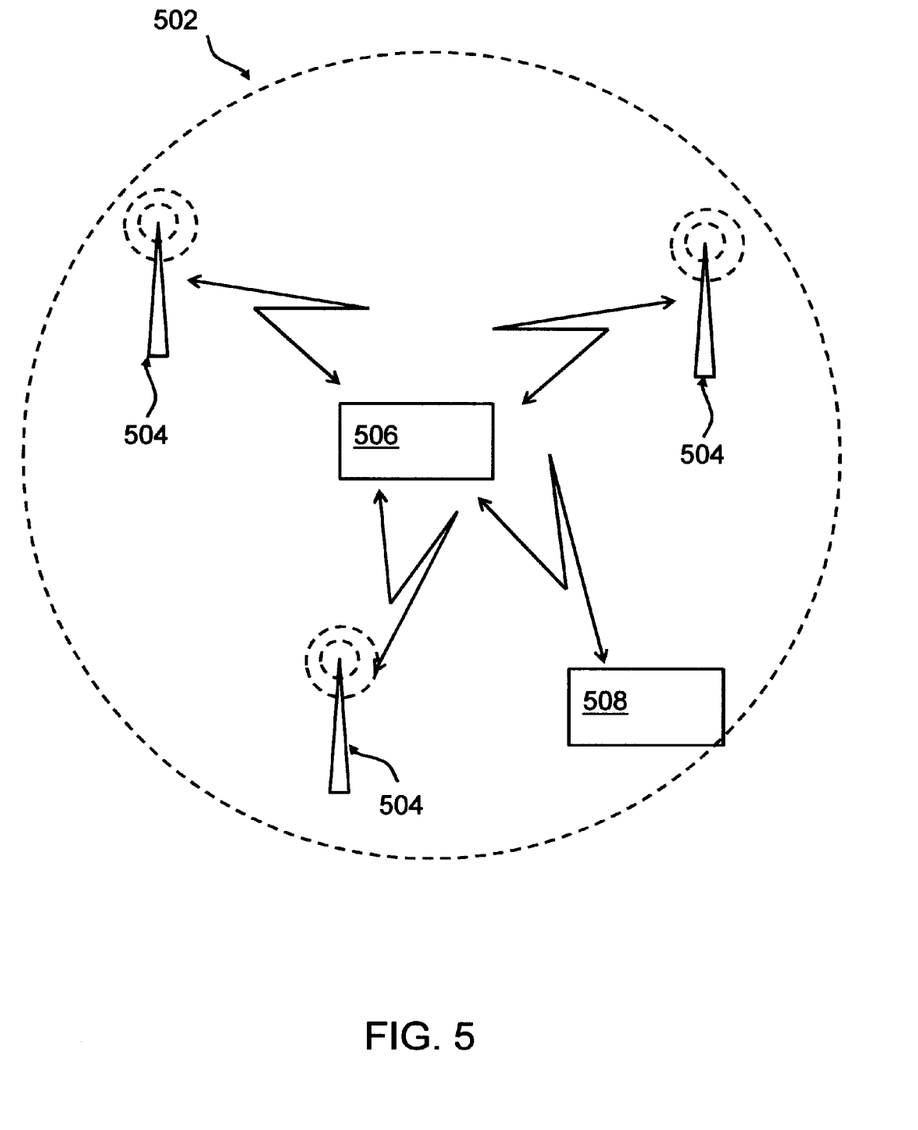
FIG. 5 illustrates schematically an embodiment of locating an appliance in an asset management area.

FIG. 5 illustrates schematically an embodiment of locating an appliance in an asset management area 502. At least three WLAN routers 504 with appropriate antennas may be used to locate an appliance by communicating with the second or fourth communication unit being part of the equipment device chip, which may be embedded in the appliance 506. Conventional triangulation techniques may be applied to locate the appliance 506 within the asset management area 502. The keycode unit 508 may be inside or outside of the asset management area 502. If the keycode unit 508 may be outside of the asset management area, a communication with the equipment device chip may be performed with a communication method alternative to WLAN. This may require the second and the fourth communication unit, which are discussed in more detail below.

Figure 6:
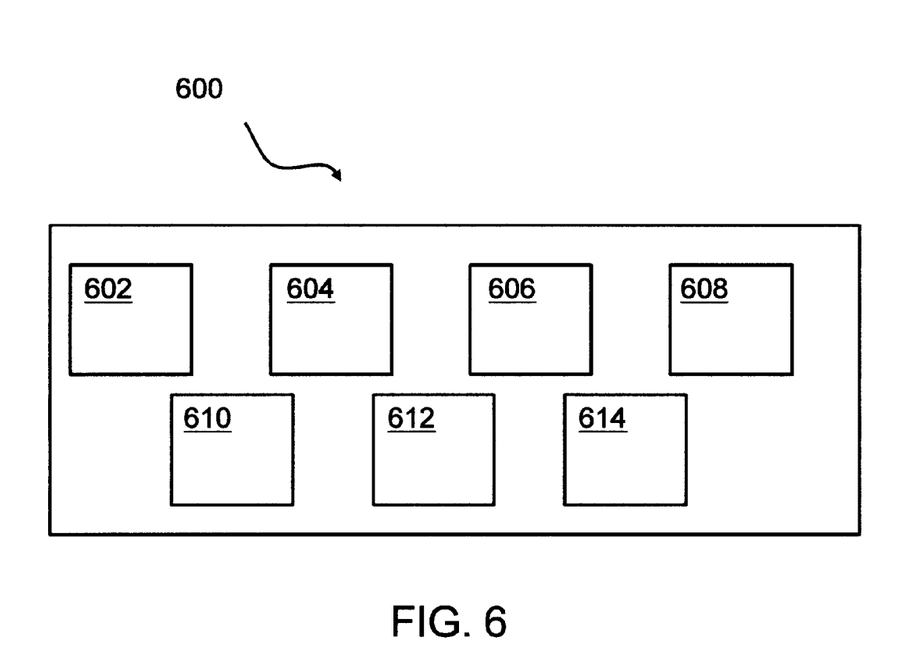
FIG. 6 shows a block diagram of an embodiment of the method for operating an asset management system.

FIG. 6 shows a block diagram of an embodiment of a method 600 for operating an asset management system. The method 600 may comprise using a keycode unit comprising a keycode device chip having a first communication unit and a keycode unit memory, and an equipment unit embedded in an appliance. The equipment unit may comprise an equipment device chip comprising a positioning unit, in particular a GPS unit, a lock unit, a second communication unit corresponding to the first communication unit, and a memory. The method may further comprise: positioning 602 the first keycode unit in a protected environment, such that the keycode unit (e.g., keycode unit 102 of FIG. 1) is protected against unauthorized access; powering 604 the keycode unit by inductive coupling to a power line; registering 606 the equipment unit by sending an identification code from the keycode unit to the equipment unit; storing 608, the identification code in the memory of the equipment device chip; defining 610 an asset management area; signaling 612 positioning coordinates received by the positioning unit of the equipment device chip via the second communication unit and the first communication unit to the keycode unit; and locking 614 the appliance, if the appliance is moved outside the defined asset management area, in response to a signal sent by the keycode unit to the equipment unit.

Figure 8:
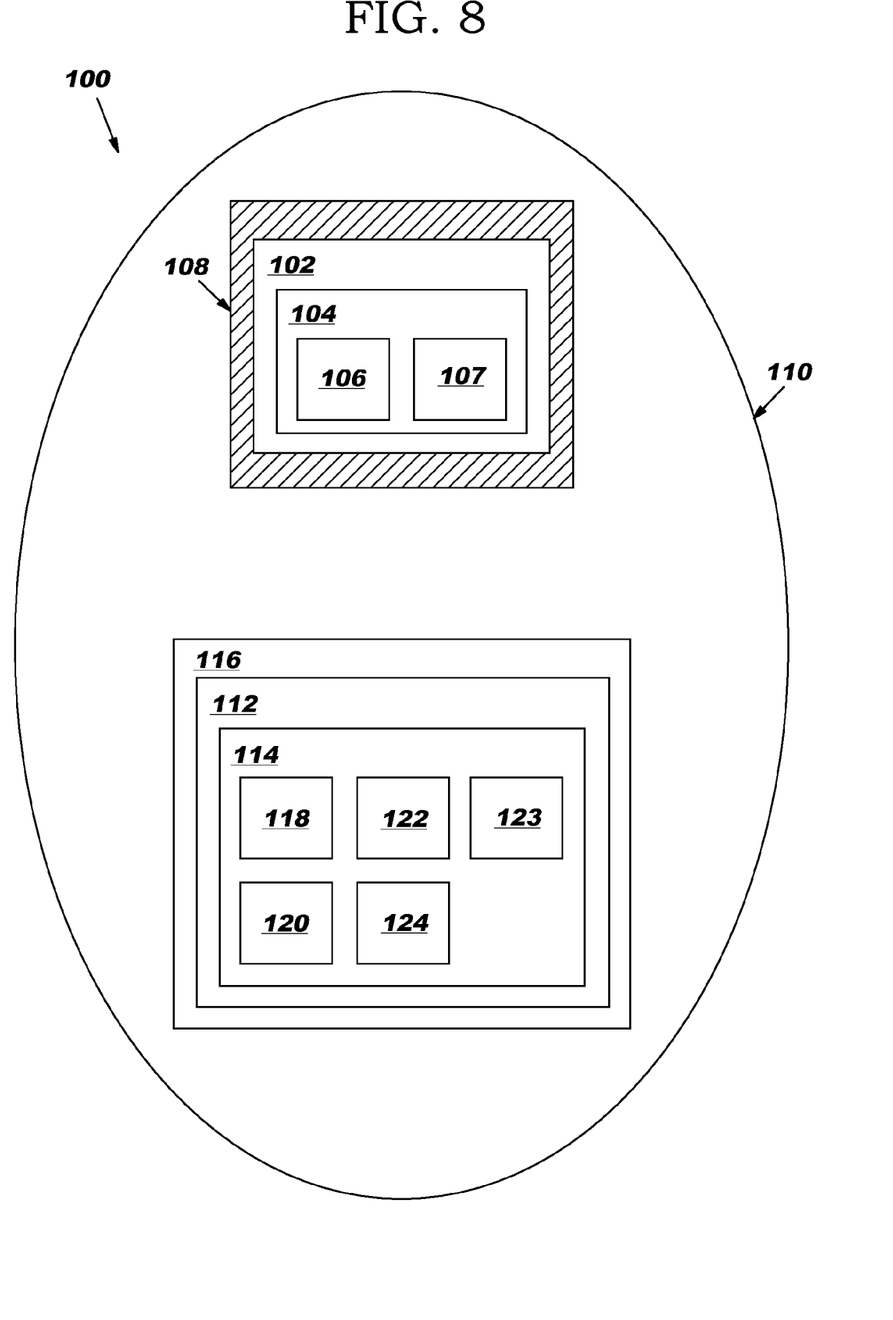
FIG. 8 shows a block diagram of an alternative embodiment of the asset management system.

In one embodiment of the present invention, the keycode unit, in particular, the keycode device chip, may comprise a third communication unit. See FIG. 8, where the third communication unit is illustrated at 107. The third communication unit may be different to the first communication unit. If the first communication unit may, e.g., be based on WLAN (wireless local area network) technology, the third communication unit may, e.g., be a communication unit enabling PowerLAN communication, i.e., a modulation on the power line which is used instead of local area network cables. However, the third communication unit may alternatively be based on wireless communication standards like GSM (Global System for Mobile communication), UMTS (Universal Mobile Telecommunications Systems), or LTE (Long-Term Alternative). Alternatively, other proprietary wireless or wire-based communication systems may be used, e.g., Blue Tooth. This may have the advantage that the equipment unit and the keycode unit may communicate on different channels with each other. Actually, the first and the third communication unit may be any of the above-mentioned communication alternatives as long as they are different and as long as the equipment unit may have a corresponding communication capability being adapted to communicate to the keycode unit.

In case the third communication unit may be PowerLAN-based, the keycode unit may not need to be placed inside the asset management area. It may just be connected to WLAN routers as part of the management area via a PowerLAN.

In another embodiment, the asset management system, the equipment unit, in particular the equipment device chip, may comprise a fourth communication unit configured to communicate with the third communication unit of the keycode device chip. See FIG. 8, where the fourth communication unit is illustrated at 123. This fourth communication unit may be used alternatively to the second communication unit for communication with the keycode unit. This way, the second communication unit may be used for a positioning of the appliance in case a satellite-based positioning system may be not working, e.g., inside buildings.

In another alternative embodiment, the equipment unit may be adapted to unlock the appliance based on a signal received from the keycode unit. The signal may be generated based on a registration confirmation signal received by the keycode unit from the equipment unit upon storing an equipment identification code in the memory of the equipment device chip. The equipment identification code may be received from the keycode unit. This equipment identification code may have been sent from the keycode unit during a registration process. Thus, an appliance may only operate properly if the appliance, i.e., the equipment device chip, may be known and registered by the keycode device chip in the sense defined above. E.g., unauthorized usage or theft may be avoided. A regular refresh of the registration signal may be sent from the keycode unit to the equipment unit.

In one embodiment of the system, the equipment device chip may be an ASIC (application specific integrated circuit). This may allow a production on a large scale at low costs. Also, plagiarism may be avoided. The same may apply for the equipment device chip.

In yet another embodiment of the system, the locking of the appliance may be based on one or more eFuse devices in the equipment unit, or in the equipment device chip, respectively. This way, an appliance may be disabled in the sense that the appliance may not be used anymore because it may not be powered-on or because only a limited functionality may be usable as explained above. This option may be used if the appliance may be moved outside the asset management area.

In another embodiment of the system, the equipment unit, in particular the equipment device chip, may comprise a power consumption measurement unit. This may enable advanced environmental protection. The measured power consumption of the appliance may be transmitted to the keycode unit and may be logged there in the memory of the keycode device chip. These data may regularly be downloaded to a computer system for further analysis and in a closed-loop process being used to change usage of the appliance.

In yet another embodiment of the system, the keycode device chip may comprise a positioning receiver, in particular a GPS or other positioning system receiver. This may have the advantage that the asset management area may be defined as covering a circular, rectangular, or elliptical area around the keycode unit. Calculations of distances may be performed easier and faster. It may also be possible to detect a movement of the keycode unit. The keycode may, in this case, send a wireless signal to a controlling computer system or another alarm system.

One embodiment of the method for operating an asset management system may comprise locating a position of the appliance by a plurality of, in particular at least three, WLAN routers that are in wireless communication contact to the equipment unit as well as in communication contact to the keycode unit. The communication router-to-equipment-unit may be performed based on a WLAN protocol, while the communication key-code-to-router may, e.g., be based on a PowerLAN technology. Other communication options may be used alternatively.

Such a locating option of an appliance offers a wide range of functions for an asset management system. E.g., a real-time inventory and real-time asset management in warehouses, stores, companies, households, etc. may easily be performed. A tracking of medical records and lab test results and samples, hospital supplies, etc. may be done in real-time, reducing error rates. The same applies for a highly efficient parts- and goods-finding in warehouses and companies. In combination with a computer system that may be linked to the keycode device chip, wireless or wired, advanced analysis capabilities may be provided.

Another embodiment of the method may comprise storing data received from the equipment unit in the keycode unit memory. These data may be location date of the appliance depending on time, usage of the appliance, power consumption, power-on time and dates, error incidents of the appliance, etc. This valuable information may be downloaded to a computer system from the memory of the keycode device chip for further analysis. This may also include an automatic allocation to different cost centers within an enterprise.

Still another embodiment of the method may comprise de-registering the appliance from an inventory list stored in the keycode unit memory. This may allow removing an appliance from an asset management area without disabling the appliance or without any alarms. The appliance may be used in a different asset management area again after re-registering. In the context of registering and de-registering, a series of other options may be mentioned here:

Try-Before-Buy:

An embodiment of the present invention may allow businesses to release hardware to consumers on a time-limited trial with a reduced risk of loss. The hardware may be set to automatically disable itself after a predefined time duration if the consumer does not purchase or return the hardware into the asset management area. It may also be reset remotely/automatically (and may be used for the consumer's asset protection and recovery) if the consumer decides to pay for the product during the trial period.

This may also be extended to temporarily allow extended features like higher resolution, faster processor speed, etc., to a purchased base product. The consumer may have access to extended/professional/bonus features for a limited time with the option to purchase them. The features may automatically be disabled if they are not purchased, but the consumer may be more likely to want to purchase them after using them during the trial period. The base product may be "upgraded" at any time later remotely/automatically if the consumer pays for the extended features.

Pay-as-You-go/Rental:

Consider the pay-as-you-go and/or rent-to-own industry in which consumers may pay per period (usually per month) for technology such as televisions and computers. It may be a problem for the industry when consumers fail to pay and still use the products, even if they are not paying for them. An embodiment of the present invention may allow the company to disable the technology remotely and/or automatically if the consumer does not pay.

Code-Based Protection:

Many products such as cell phones and GPS units may have a feature to discourage theft—such as entering a keycode (often just 3 to 4 digits) to enable the device. However, a very determined thief may eventually defeat this security feature by brute-force attack of all possible codes. An embodiment of the present invention may allow a better strategy of disabling the device, and not allowing other attempts, after a set number of failed attempts.

Pay-by-Location:

If a customer may be in a certain location, the customer's device may be activated and he may pay for a device or service. Then, when he may move to a different location where he may not need this device or service, the device may be "turned" off and the customer may not have to pay for it.

In all cases above, the disabling mechanism may be hardware or software-based and may be permanent or temporary.

Another embodiment of the invention may comprise delaying a power-on of the appliance by the equipment unit to a predefined power-on time. This may allow a better management of electricity cost. The appliance may, e.g., be switched on during low cost power time during off peak hours for, e.g., washing machines and dishwashers. A system comprising the keycode unit, the equipment unit, and a computer system using a Web-based user interface to the functions and data in the keycode device chip may make the management of the entire system much easier.

Yet again an alternative embodiment of the method may comprise repeatedly refreshing an initialization of the equipment unit by a signal sent from the keycode unit to the equipment unit as long as the equipment unit is located within the asset management area. This may increase the security of the asset management system. A mechanism may be provided according to which the equipment device chip "forgets", i.e., deletes the appliance identification code stored in the memory of the equipment device chip. This may lead to an automatic disablement of the appliance. Only a regular new registration, i.e., a transmission and storage of the appliance identification code, may stop an automatic disablement of the appliance.

FIG. 7 shows schematically a computer system that may be connected to an asset management system.

Embodiments of the invention may partly be implemented on virtually any type of computer, regardless of the platform being used, that is suitable for storing and/or executing program code. For example, as shown in FIG. 7, a computer system 700 may include one or more processor(s) 702 with one or more cores per processor, associated memory elements 704, an internal storage device 706 (e.g., a hard disk, an optical drive such as a compact disk drive or digital video disk (DVD) drive, a flash memory stick, etc.), and numerous other elements and functionalities typical of today's computers (not shown). The memory elements 704 may include a main memory, employed during actual execution of the program code, and a cache memory, which provides temporary storage for at least some program code or data in order to reduce the number of times code must be retrieved from external bulk storage 716 for execution. Elements inside the computer 700 may be linked together by means of a bus system 718 with corresponding adapters. Additionally, a driver 703 for a PowerLAN communication may be attached to the bus system 718.

The computer system 700 may also include input means, such as a keyboard 708, a mouse 710, or a microphone (not shown). Furthermore, the computer 700 may include output means, such as a monitor 712. The monitor may be, e.g., a liquid crystal display (LCD), a plasma display, a light emitting diode display (LED), or a cathode ray tube (CRT) monitor. The computer system 700 may be connected to a network, which may be, e.g., a local area network (LAN), a wide area network (WAN), such as the Internet, or any other similar type of network, including wireless networks, via a network interface connection 714. This may allow a coupling to other computer systems. Those skilled in the art will appreciate that many different types of computer systems exist, and the aforementioned input and output means may take other forms. Generally speaking, the computer system 700 may include at least the minimal processing, and input and/or output means, necessary to practice embodiments of the invention.

Further, those skilled in the art will appreciate that one or more elements of the aforementioned computer system 700 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system.

Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

It should be noted that embodiments of the present invention may take the form of an entirely hardware implementation, an entirely software embodiment, or an embodiment containing both hardware and software elements. In a preferred embodiment, the invention may be implemented in software which includes, but is not limited to, firmware, resident software, and microcode.

In one embodiment, a data processing program for execution in a data processing system may be provided comprising software code portions for performing the method, as described above, when the program is run on a data processing system. The data processing system may be a computer or computer system attached to the asset management system via communication means.

Furthermore, embodiments may take the form of a computer program product that is accessible from a computer-usable or computer-readable medium providing program code for use by, or in connection with, a computer or any instruction execution system. For the purpose of this description, a computer-usable or computer-readable medium may be any apparatus that may contain means for storing, communicating, propagating, or transporting the program for use by, or in a connection with, the instruction execution system, apparatus, or device.

The medium may be an electronic, magnetic, optical, electromagnetic, infrared, or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), DVD, and Blu-Ray-Disk.

It should also be noted that embodiments of the invention have been described with reference to different subject matter. In particular, some embodiments have been described with reference to methods whereas other embodiments have been described with reference to apparatus. However, a person skilled in the art will gather from the above-provided description that, unless otherwise notified, in addition to any combination of features belonging to one type of subject matter, also any combination between features relating to different subject matter (and in particular, between features of the methods and features of the apparatus) is considered as to be disclosed herein.

It should be noted that the aspects defined above and further aspects of the present invention have been described herein with references to examples which are to be understood as exemplary but not limiting of the present invention.

While the invention has been described with respect to a limited number of embodiments, those skilled in the art, benefiting from this disclosure, will appreciate that other embodiments may be devised which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined.

The invention claimed is:

1. An asset management system for a control of electric appliances, the asset management system comprising:
a keycode unit comprising a keycode device chip having a first communication unit wherein the keycode unit is located in a protected environment and relates to an asset management area, and wherein a power supply for the keycode unit is provided by induction from a power line; and an equipment unit, embedded in an appliance, the equipment unit comprising an equipment device chip comprising a positioning system unit, a lock unit, a second communication unit and a memory, the memory being adapted for storing an appliance identification code;

wherein the keycode unit and the equipment unit are in communication contact to each other via the first communication unit and the second communication unit, the second communication unit being adapted for sending positioning coordinates, which the positioning system unit receives, from the equipment unit to the keycode unit, and wherein the equipment unit is adapted to lock the appliance via the lock unit, in response to a lock signal that the equipment unit receives from the keycode unit if the appliance moves outside the asset management area.

2. The asset management system according to claim 1, wherein the keycode unit further comprises a third communication unit.

3. The asset management system according to claim 2, wherein the equipment unit further comprises a fourth communication unit configured to communicate with the third communication unit.

4. The asset management system according to claim 1, wherein the equipment unit is adapted to unlock the appliance based on a signal received from the keycode unit, the signal generated based on a registration confirmation signal received by the keycode unit from the equipment unit upon storing an equipment identification code in the memory of the equipment device chip, the equipment identification code being received from the keycode unit.

5. The asset management system according to claim 1, wherein the keycode device chip is an application-specific integrated circuit ("ASIC").

6. The asset management system according to claim 1, wherein the equipment device chip is an application-specific integrated circuit ("ASIC").

7. The asset management system according to claim 1, wherein the locking of the appliance is based on an eFuse in the equipment unit.

8. The asset management system according to claim 1, wherein the equipment unit further comprises a power consumption measurement unit.

9. The asset management system according to claim 1, wherein the keycode device chip further comprises a positioning system receiver.

10. A method for operating an asset management system, the asset management system comprising a keycode unit comprising a keycode device chip having a first communication unit and keycode unit memory, and an equipment unit embedded in an appliance, the equipment unit comprising an equipment device chip comprising a positioning system unit, a lock unit, a second communication unit corresponding to the first communication unit, and a memory, the method comprising:

positioning the first keycode unit in a protected environment, such that the keycode unit is protected against unauthorized access;

powering the keycode unit by inductive coupling to a power line;

registering the equipment unit by sending an identification code from the keycode unit to the equipment unit and storing the identification code in the memory of the equipment device chip;

defining an asset management area;

signaling positioning coordinates received by the positioning system unit of the equipment device chip via the second communication unit and the first communication unit to the keycode unit; and locking the appliance, if the appliance is moved outside the defined asset management area, in response to a signal sent by the keycode unit to the equipment unit.

11. The method according to claim 10, further comprising locating a position of the appliance by a plurality of WLAN routers that are in wireless communication contact to the equipment unit as well as in communication contact to the keycode unit.

12. The method according to claim 10, further comprising storing data received from the equipment unit in the keycode unit memory.

13. The method according to claim 10, further comprising de-registering the appliance from an inventory list stored in the keycode unit memory.

14. The method according to claim 10, further comprising delaying a power-on of the appliance by the equipment unit to a predefined power-on time.

15. The method according to claim 10, further comprising repeatedly refreshing an initialization of the equipment unit by a signal sent from the keycode unit to the equipment unit as long as the equipment unit is located within the asset management area.

16. A computer program product for operating an asset management system, the asset management system comprising a keycode unit and an equipment unit embedded in an appliance, the keycode unit comprising a keycode device chip having a first communication unit and keycode unit memory and the equipment unit comprising an equipment device chip comprising a positioning system unit, a lock unit, a second communication unit corresponding to the first communication unit, and a memory, the computer program product stored on at least one non-transitory computer-readable medium providing program code that, when executed by an instruction execution system, performs:

positioning the first keycode unit in a protected environment, such that the keycode unit is protected against unauthorized access;

powering the keycode unit by inductive coupling to a power line;

registering the equipment unit by sending an identification code from the keycode unit to the equipment unit and storing the identification code in the memory of the equipment device chip;

defining an asset management area;

signaling positioning coordinates received by the positioning system unit of the equipment device chip via the second communication unit and the first communication unit to the keycode unit; and locking the appliance, if the appliance is moved outside the defined asset management area, in response to a signal sent by the keycode unit to the equipment unit.

\* \* \* \* \*